United States Patent
Crabtree et al.

(10) Patent No.: US 10,659,502 B2
(45) Date of Patent: May 19, 2020

(54) MULTICAST STREAMING

(71) Applicant: BRITISH TELECOMMUNICATIONS PUBLIC LIMITED COMPANY, London (GB)

(72) Inventors: Ian Crabtree, London (GB); Michael Nilsson, London (GB); Rory Turnbull, London (GB); Stephen Appleby, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/129,486

(22) PCT Filed: Mar. 24, 2015

(86) PCT No.: PCT/GB2015/050875
§ 371 (c)(1),
(2) Date: Sep. 27, 2016

(87) PCT Pub. No.: WO2015/150737
PCT Pub. Date: Oct. 8, 2015

(65) Prior Publication Data
US 2017/0118263 A1    Apr. 27, 2017

(30) Foreign Application Priority Data
Mar. 31, 2014    (EP) ..................... 14250067

(51) Int. Cl.
*H04L 29/06*    (2006.01)
*H04N 21/6405*   (2011.01)
(Continued)

(52) U.S. Cl.
CPC ........ *H04L 65/4076* (2013.01); *H04L 65/607* (2013.01); *H04L 67/02* (2013.01);
(Continued)

(58) Field of Classification Search
None
See application file for complete search history.

(56) References Cited

U.S. PATENT DOCUMENTS

| 8,532,171 B1 | 9/2013 | Narayanan et al. |
| 2004/0194143 A1* | 9/2004 | Hirose ............... H04N 7/17354 |
| | | 725/97 |

(Continued)

FOREIGN PATENT DOCUMENTS

| WO | WO 2012/074874 | 6/2012 |
| WO | 2014/063726 | 5/2014 |

OTHER PUBLICATIONS

International Search Report for PCT/GB2015/050875 dated Jun. 11, 2015, 3 pages.
(Continued)

*Primary Examiner* — Joshua Joo
(74) *Attorney, Agent, or Firm* — Nixon & Vanderhye P.C.

(57) ABSTRACT

The invention presents a method of providing feedback for receipt of a multicast video stream. The feedback mechanism allows the number of clients receiving over multicast to be determined, which can then be used to manage multicast delivery, including switching decisions between multicast and unicast. Video content is delivered over a multicast stream from a content server to a plurality of client devices. The client devices are each configured to respond at regular intervals whilst receiving the multicast video stream by transmitting an HTTP HEAD request message to the content server. The HTTP HEAD request refers to metadata relating to a manifest file associated with the video stream. The number of client devices receiving the multicast video stream is determined based on the number of HEAD requests received at the content server. The multicast video delivery can then be managed accordingly, and can also take
(Continued)

into account the number of unicast clients that are requesting the corresponding unicast stream to the multicast stream.

14 Claims, 6 Drawing Sheets

(51) Int. Cl.
*H04W 76/40* (2018.01)
*H04N 21/438* (2011.01)
*H04N 21/845* (2011.01)
*H04N 21/2343* (2011.01)
*H04N 21/6408* (2011.01)
*H04L 29/08* (2006.01)

(52) U.S. Cl.
CPC ... *H04N 21/23439* (2013.01); *H04N 21/4383* (2013.01); *H04N 21/6405* (2013.01); *H04N 21/6408* (2013.01); *H04N 21/8456* (2013.01); *H04W 76/40* (2018.02); *H04L 67/42* (2013.01)

(56) References Cited

U.S. PATENT DOCUMENTS

| | | | | |
|---|---|---|---|---|
| 2004/0268233 | A1* | 12/2004 | Okumura | G06F 17/2229 715/247 |
| 2006/0160549 | A1* | 7/2006 | Sato | H04W 72/005 455/503 |
| 2007/0147411 | A1* | 6/2007 | Bijwaard | H04L 12/185 370/432 |
| 2007/0168523 | A1* | 7/2007 | Jiang | H04L 29/06027 709/228 |
| 2007/0291661 | A1* | 12/2007 | Nishibayashi | H04L 12/66 370/252 |
| 2008/0151881 | A1 | 6/2008 | Liu | |
| 2009/0052450 | A1* | 2/2009 | Mockett | H04L 1/0009 370/390 |
| 2009/0185522 | A1* | 7/2009 | Periyalwar | H04W 48/18 370/328 |
| 2009/0217318 | A1 | 8/2009 | Versteeg | |
| 2010/0165902 | A1* | 7/2010 | Kvernvik | H04L 12/189 370/312 |
| 2010/0281108 | A1* | 11/2010 | Cohen | H04N 21/235 709/203 |
| 2012/0033037 | A1* | 2/2012 | Chen | H04N 19/597 348/43 |
| 2012/0140645 | A1 | 6/2012 | Bonta et al. | |
| 2012/0144445 | A1 | 6/2012 | Bonta | |
| 2012/0259994 | A1 | 10/2012 | Gillies et al. | |
| 2013/0024582 | A1 | 1/2013 | Rodrigues | |
| 2013/0067523 | A1* | 3/2013 | Kamitakahara | H04N 21/654 725/96 |
| 2013/0094367 | A1* | 4/2013 | Zou | H04L 12/189 370/241 |
| 2013/0094428 | A1* | 4/2013 | Lee | H04L 12/189 370/312 |
| 2013/0159544 | A1* | 6/2013 | Cooper | H04L 12/185 709/231 |
| 2013/0279391 | A1* | 10/2013 | Gupta | H04L 12/189 370/312 |
| 2013/0294747 | A1 | 11/2013 | Takahashi | |
| 2013/0343381 | A1 | 12/2013 | Klimker | |
| 2014/0254456 | A1* | 9/2014 | Roh | H04L 12/189 370/312 |
| 2014/0372624 | A1* | 12/2014 | Wang | H04L 65/60 709/231 |
| 2015/0223074 | A1* | 8/2015 | Prytz | H04W 16/14 370/235 |
| 2016/0080446 | A1* | 3/2016 | Karthikeyan | H04N 21/2408 709/219 |
| 2016/0373819 | A1* | 12/2016 | Ramakrishnan | H04N 7/17318 |

OTHER PUBLICATIONS

U.S. Appl. No. 15/129,486, filed Sep. 27, 2016, Multicast Streaming.
U.S. Appl. No. 15/129,481, filed Sep. 27, 2016, Multicast Streaming.
Amon, Peter et al., "File Format for Scalable Video Coding (SVC)", Joint Video Team (JVT) of ISO/IEC MPEG & ITU-T VCEG (ISO/IEC JTC1/SC29/WG11 and ITU-T SG16 Q.6), 21st Meeting: Hangzhou, China, Oct. 20-27, 2006 (11 pgs.).
After Final Office Action dated Mar. 22, 2018 in U.S. Appl. No. 15/129,481 to Crabtree, filed Sep. 27, 2016 (14 pages).
Office Action dated Jul. 3, 2017 in U.S. Appl. No. 15/129,481 to Crabtree, filed Sep. 27, 2016 (13 pages).
Office Action dated Jan. 24, 2019 in U.S. Appl. No. 15/129,481 to Crabtree, filed Sep. 27, 2016 (15 pages).

\* cited by examiner

Figure 5

```
User Datagram header format:
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          source port          |       destination port        |
+-+-+-+-+-+-+-+-+-+-+-+-+-+-+-+-+-+-+-+-+-+-+-+-+-+-+-+-+-+-+-+-+
|            length             |           checksum            |
+-+-+-+-+-+-+-+-+-+-+-+-+-+-+-+-+-+-+-+-+-+-+-+-+-+-+-+-+-+-+-+-+
```

Figure 6

```
RTP header format:
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

Figure 7

```
Multicast RTP payload header format:
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          chunk index          |         chunk offset          |
+-+-+-+-+-+-+-+-+-+-+-+-+-+-+-+-+-+-+-+-+-+-+-+-+-+-+-+-+-+-+-+-+
|         chunk offset          |         data octets ....      |
+-+-+-+-+-+-+-+-+-+-+-+-+-+-+-+-+-+-+-+-+-+-+-+-+-+-+-+-+-+-+-+-+
|      data octets ....
+-+-+-+-+-+-+-+-+-+-+-+-+-+-+-+-
```

MULTICAST STREAMING

This application is the U.S. national phase of International Application No. PCT/GB2015/050875 filed 24 Mar. 2015 which designated the U.S. and claims priority to EP Patent Application No. 14250067.7 filed 31 Mar. 2014, the entire contents of each of which are hereby incorporated by reference.

FIELD OF THE INVENTION

This invention relates to the field of multicast video streaming.

BACKGROUND TO THE INVENTION

Currently live television delivered over IP networks uses one of two quite different networking technologies: one based on multicast and the other based on unicast. With multicast transmission, a single multicast stream carrying the content is pushed from a content server to multiple network nodes simultaneously, with those network nodes duplicating the content and forwarding to any subsequent nodes or clients as required. With unicast transmission, multiple streams of content are pulled from the server, one for each device consuming the content, typically using HTTP over TCP and Adaptive Bit Rate technology.

Multicast makes efficient use of the network when delivering the same content at the same time to many end devices, but often requires continual allocation of network resources regardless of the amount of viewing. In addition, many end devices such as some tablets and smartphones, do not currently support multicast.

Unicast suffers from sending multiple copies of the same content through the network, but requires no usage-independent allocation of network resources. Moreover, unicast is capable of delivering to all end devices, even in the presence of low or variable network throughput to the end device, which is a frequent occurrence for devices connected by wireless technology for example.

US patent application 2013/0024582 describes a system and method for dynamically switching between unicast and multicast delivery of media content in response to changes in concurrent demand for access to the media content. Furthermore, sequence numbers included in the video frames are used to align between unicast and multicast stream content.

SUMMARY OF THE INVENTION

According to one aspect of the present invention, there is provided a method of managing multicast video delivery comprising:
  receiving a multicast video stream at a plurality of client devices from a server;
  transmitting from each of the client devices, a message to the server in response to receiving the multicast video stream;
  determining the number of client devices receiving the multicast video stream based on the transmitted messages;
  managing the multicast video delivery in dependence on the number of client devices determined.

The message may take the form of an HTTP HEAD request message, with the request being for updates to a manifest file associated with the video stream. Use of HEAD requests is advantageous as the server can easily distinguish the feedback from that from unicast GET requests, and thus make comparisons between the number of multicast clients compared to unicast clients receiving some piece of video.

The transmitting of messages by a client device may be performed at regular intervals whilst the multicast video stream is being received at the client.

Managing the multicast video delivery can comprise determining whether to continue transmission of the video stream by multicast. This decision can be based on the determined number of clients, and also knowledge of the number of clients receiving the same video content over unicast.

BRIEF DESCRIPTION OF THE DRAWINGS

For a better understanding of the present invention reference will now be made by way of example only to the accompanying drawings, in which:

FIG. 5 shows the format of a UDP header;

FIG. 6 shows the format of an RTP header;

FIG. 7 shows the format of an RTP payload header format in an example of the present invention;

DESCRIPTION OF PREFERRED EMBODIMENTS

The present invention is described herein with reference to particular examples. The invention is not, however, limited to such examples.

Examples of the present invention present a method of providing feedback for receipt of a multicast video stream. The feedback mechanism allows the number of clients receiving over multicast to be determined, which can then be used to manage multicast delivery, including switching decisions between multicast and unicast. Video content is delivered over a multicast stream from a content server to a plurality of client devices. The client devices are each configured to respond at regular intervals whilst receiving the multicast video stream by transmitting an HTTP HEAD request message to the content server. The HTTP HEAD request refers to metadata relating to a manifest file associated with the video stream. The number of client devices receiving the multicast video stream is determined based on the number of HEAD requests received at the content server. The multicast video delivery can then be managed accordingly, and can also take into account the number of unicast clients that are requesting the corresponding unicast stream to the multicast stream.

Figure 1:
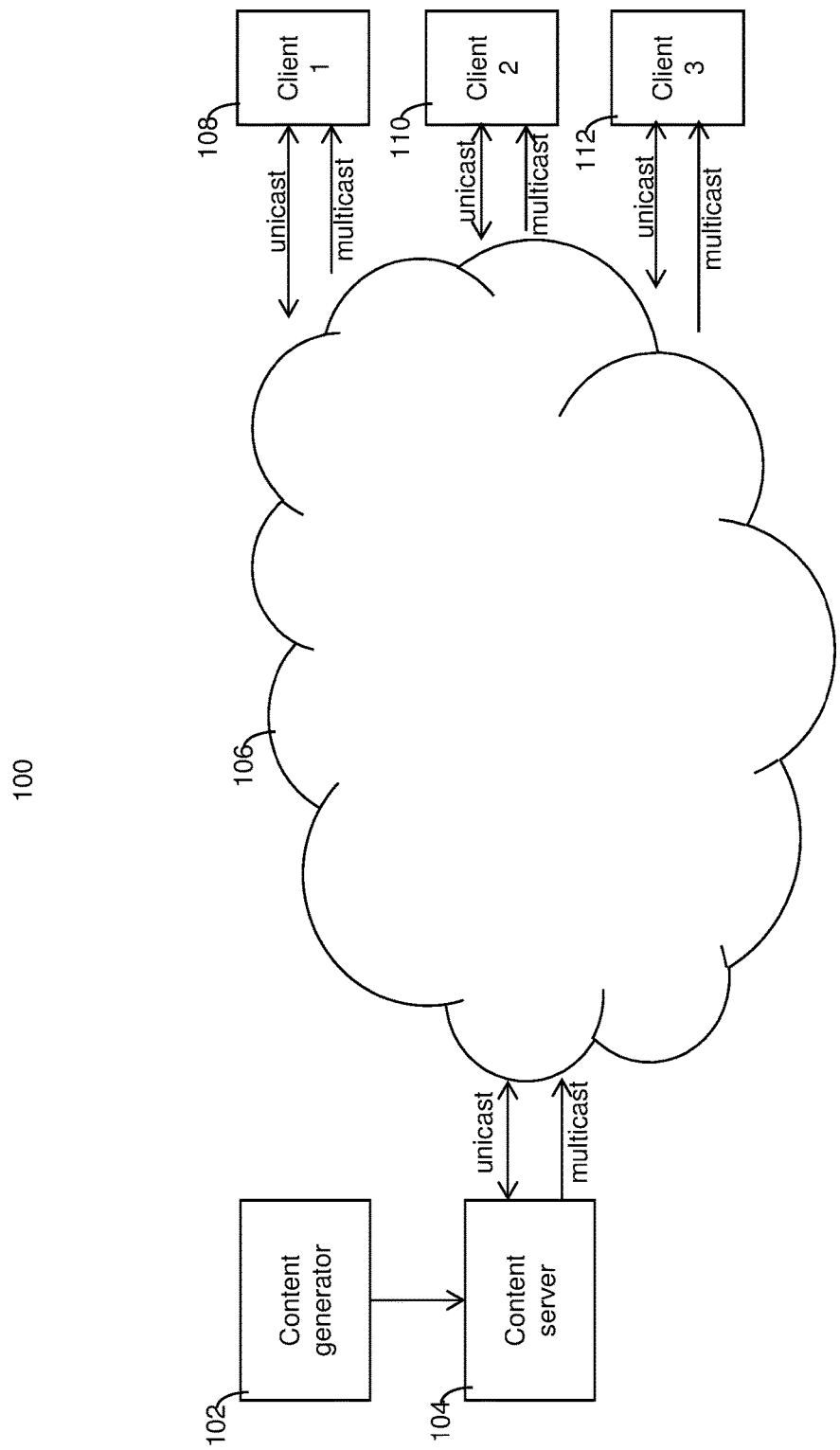
FIG. 1 is a network diagram in an example of the present invention.

FIG. 1 shows a system 100 comprising a content generator 102 communicating with a content server 104. The content generator is responsible for receiving uncompressed video content, such as live TV, and encoding and packaging the video content to pass to the content server 104. The content server 104 is responsible for storing the received video content, and in case of unicast delivery, content is pulled from the server, whereas for multicast delivery, content is pushed from the server to suitably configured clients connected over the network 106. In this example there are shown three clients 108, 110 and 112. The clients may be standard HTTP Adaptive Bit Rate streaming clients, adapted to support MPEG DASH or Apple's HTTP Live Streaming (HLS) for example. The clients are adapted to discover content, request and process manifest files, request chunks of content over unicast, and process those chunks for viewing. Whilst content can be delivered over the network 106 directly to these clients, delivery can be made via a proxy local to each client, which has certain benefits.

The content server 104 also includes a mechanism for switching between unicast and multicast delivery methods, and generating of a multicast stream, during the delivery of any given encoded content, such as a TV program or film.

Figure 2:
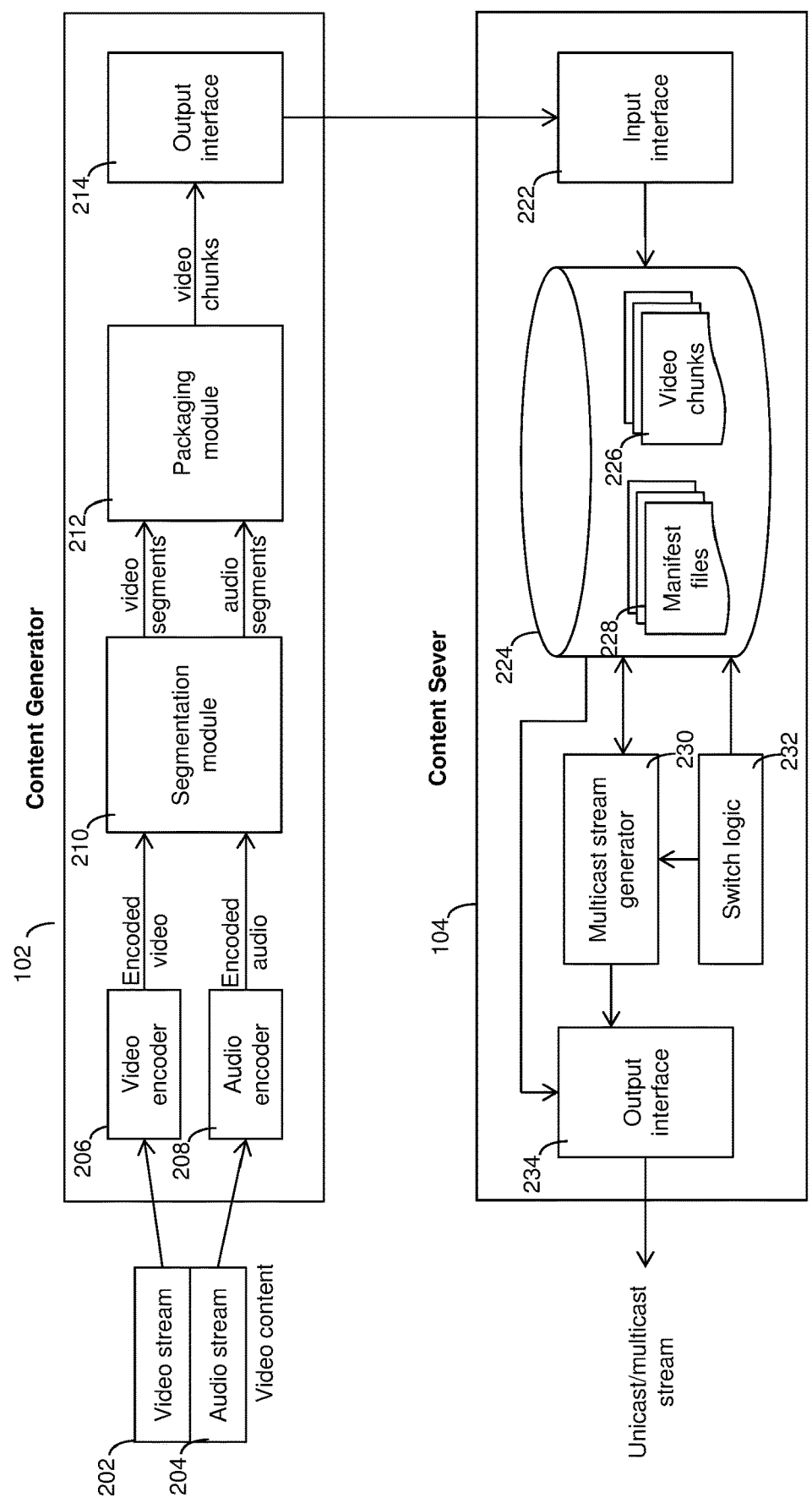
FIG. 2 is a system diagram showing the content generator and content server in greater detail.
Figure 3:
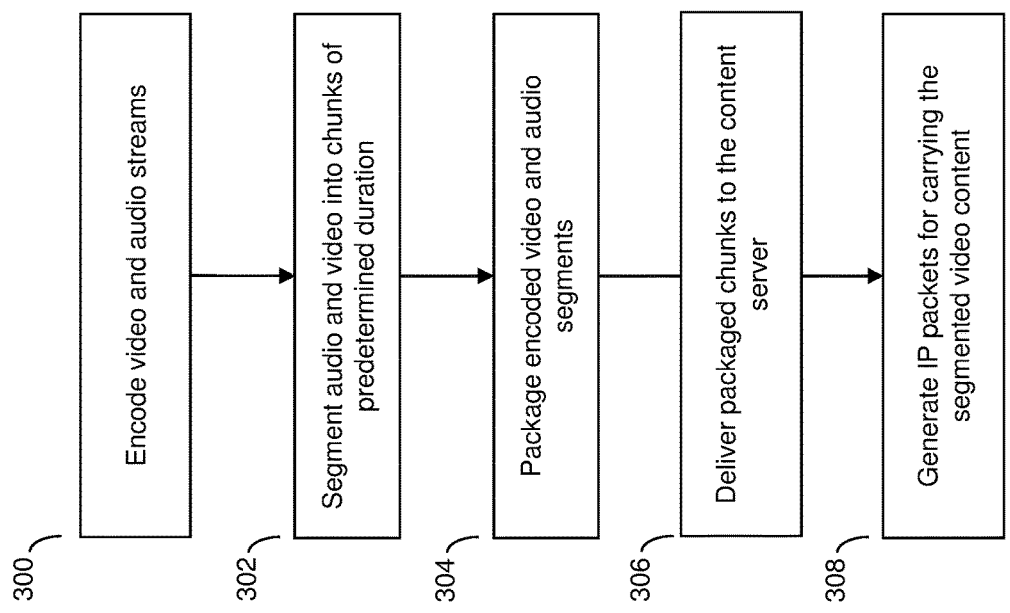
FIG. 3 is a flow chart summarising the main steps of an example of the invention.

The content generator 102 and content server 104 are shown in more detail in FIG. 2. The operation and components of the content generator 102 and the content server 104 will be described with reference to the flow chart of FIG. 3, which outlines the general method.

As shown in FIG. 2, the content generator 102 comprises a video encoder 206, and audio encoder 208, a segmentation module 210, a packaging module 212, and an output interface 214. Uncompressed video content comprising an uncompressed video stream 202 and an uncompressed audio stream are received by the content generator 102. Specifically, the video encoder 206 takes the uncompressed video stream 202, and encodes the video to generate an encoded video stream. In this example, the video encoding method used is in accordance with the ITU H.264 standard, though the invention is not limited to such a standard, and other encoding methods could be used instead. Similarly, the audio encoder 208 takes the uncompressed audio stream 204, and encodes the audio to generate an encoded audio stream. In this example, the audio encoding method is MPEG-4 HE AAC v2, though the invention is not limited to such a standard, and other encoding methods could be used instead. The uncompressed video stream can be encoded at multiple bit rates (the associated uncompressed audio stream is usually only encoded at one bit rate, but may also be encoded at multiple bit rates), thus generating an encoded stream for each bit rate. The encoded video stream comprises a plurality of frames or pictures, which in turn can be clustered into groups of pictures or GOPs. This first step of encoding the video content is shown in step 300 of FIG. 3.

Next in step 302, the encoded video stream and encoded audio stream (or each encoded video and audio steam if the content was encoded at multiple bit rates) are segmented by the segmentation module 210 into discrete video and audio segments or chunks. It is envisaged that each chunk is equivalent to between 2 and 15 seconds in duration of the uncompressed video/audio, though longer or shorter durations could be used. Whilst the segmentation module 210 is shown as operating after the encoders 206 and 208, the segmenting can be performed on the uncompressed video and audio streams prior to their encoding. Thus, the uncompressed video and audio can first be segmented, and then the resulting uncompressed segments can be encoded to generate the encoded video and audio segments.

The segmentation module 210 may select the segment duration taking into account service requirements. For example, shorter segments allow switching between streams to occur quicker, both between unicast and multicast streams, or between different encoded bit rates. However, longer segments are more easily processed by system components, particularly by CDN (Content Delivery Network) nodes, but could cause slower switches between delivery modes and may introduce more end to end latency for live services.

In step 304, the video and audio segments are handled by the packaging module 212. In this example, the output of the packaging module 212 is in a so-called multiplexed format, such as the MPEG-2 Transport Stream as specified in IS 13818-1. MPEG-2 transport streams are often used for delivery of digital television in real time. The packaging module could also output in a so-called non-multiplexed format, such as the ISO Base Media File Format, as specified in IS 14496-12. MP4 fragments could also be output instead.

The MPEG-2 transport stream comprises a number of transport stream packets. Each transport stream packet carries 184 bytes of payload data, prefixed by a 4 byte header. The encoded video and audio segments are carried in the transport stream payloads, where each payload usually carries a single media type—audio, video or subtitle data for example. Typically, several transport stream packets will be required to carry each segment of audio and video. The precise number of transport stream packets required will depend on the duration of each segment of audio and video created by the segmentation module 210. The packaging module 112 will thus outputs multiple transport stream chunks to carry the respective video and audio segments, and with each transport stream chunk comprising a one or more transport stream packets. If MP4 fragments are used, then several MP4 fragments might be used to carry the same segments.

A person skilled in the art will appreciate that the functions performed by the encoders, segmentation module and packaging module can be performed by a single, suitably configured, general video encoder module.

The transport stream chunks are passed to the output interface 214, where they are in turn delivered to the content server 120 in step 306.

In addition, the content generator 102 also generates a manifest file, which describes the encoded content (the transport stream chunks in this example), and how it can be obtained, and also passes this to the content server 104. Under MPEG-DASH, the manifest is referred to as an MPD, Media Presentation Description. Apple's adaptive video streaming technology, HLS (HTTP Live Streaming), provides a manifest in the form of a playlist file (.m3u file).

As will be described later, the manifest file can be modified by the content server in an example of the invention for signalling a switch to multicast from unicast. The manifest file describes the available bit rates for each transport stream chunk, and where each is located (an address of the location where the chunk is stored in the content server 104). The manifest file is used by a client for unicast streaming.

The content server 120 receives the encoded content in chunks, at an input interface 222, in the form of transport stream chunks, and any associated manifest file, from the content generator 102. The content server 104 comprises an input interface 222, a data store 224 for storing video content, a multicast stream generator 230, switch logic 232, and an output interface 234. The data store 224 may form part of a standard web server, which is able to serve individual transport stream chunks in response to unicast requests via the output interface 234. Content provided by unicast is effectively "pulled" from the web server on request by clients.

The transport stream chunks and manifest file are passed from the input interface 222 to the data store 224, where they are stored. The data store 224 can store multiple manifest files 228, one for each distinct item of video, and video content 226 (in the form of transport stream chunks). As suggested earlier, there can be multiple versions of the same video content, each encoded at different bit rates, which are reflected in an associated manifest file.

The multicast stream generator 230 is responsible for generating multicast streams, which will typically carry multiple transport stream chunks. Multicast streams are "pushed" out to clients.

A client can initiate unicast streaming by first making a request to the content server 104 for the appropriate manifest file associated with the desired content. After receipt of the manifest file, the client can make specific requests for encoded chunks, the transport stream chunks, using the location information associated with each chunk found in the manifest. The requests take the form of HTTP requests for each chunk and are handled by the content server 104, and specifically the web server component. The transport stream chunks are packaged by the web server as standard TCP/IP packets and delivered to the client over the network. The delivery mechanism is thus a reliable one. The client can also request updated manifest files as required from the content server 104. The process will be described in more detail later.

The switch logic 232 in the content server 104 determines whether to make the transport stream chunks available for delivery by multicast as well as unicast, and when necessary, will instruct the multicast stream generator 230 to generate a multicast stream and to signal that the multicast stream is available. The latter can be done by a suitable update to the manifest file as will be described below.

The switch logic 232, for each encoded content stream, determines which, if any, of the encoded chunks are to be made available by multicast delivery as well as by unicast delivery. For example, the switch logic 232 may at one point in time determine that all content chunks for given piece of content be made available only by unicast; and at a later point in time, it may determine that the content (or a specific stream encoded at one particular bit rate) should be made available additionally by multicast; and at an even later point in time, it may determine that all content chunks be again made available only by unicast.

The decision as to when to switch to multicast from unicast might be based on the number of clients requesting a particular piece of content. If the network only allows for a single multicast stream, then the most popular content might be selected for multicast delivery to reduce the overall bandwidth used in the network. However, it may not be quite that simple, as content is can be encoded at different bit rates, and the rate that the client can handle might also vary, so the switching decision can be more complicated. However, it is thus important for the switching logic 232 to know at all times how many clients are receiving which content via unicast, and which via multicast to be able to make an appropriate switching decision.

When the switch logic determines that some of the stored content should be made available via multicast delivery, the content server 104 modifies the manifest file to also indicate the possibility of multicast delivery and how to receive the multicast stream. The content server then transmits the encoded content in a multicast stream that the switch logic has indicated for multicast delivery.

In known systems, multicast streaming of video works by encoding the content and packaging the encoded content up into transport stream packets before using a delivery mechanism such as RTP over IP. However, this approach does not lend itself to switching to and from unicast carrying video, where there is a need for precise synchronisation between the encoded content to avoid disrupting the playback of the content.

In examples of this invention, the content has been divided into segments of predetermined duration, and carried in transport stream chunks, as described above. Then the transport stream chunks are encapsulated using a transport protocol such as RTP (real time transport protocol). Specifically, the transport stream chunks are carried in the packets, specifically in RTP payloads, with the RTP packets being encapsulated using UDP (user datagram protocol) in an IP packet for multicast transmission.

Figure 4:
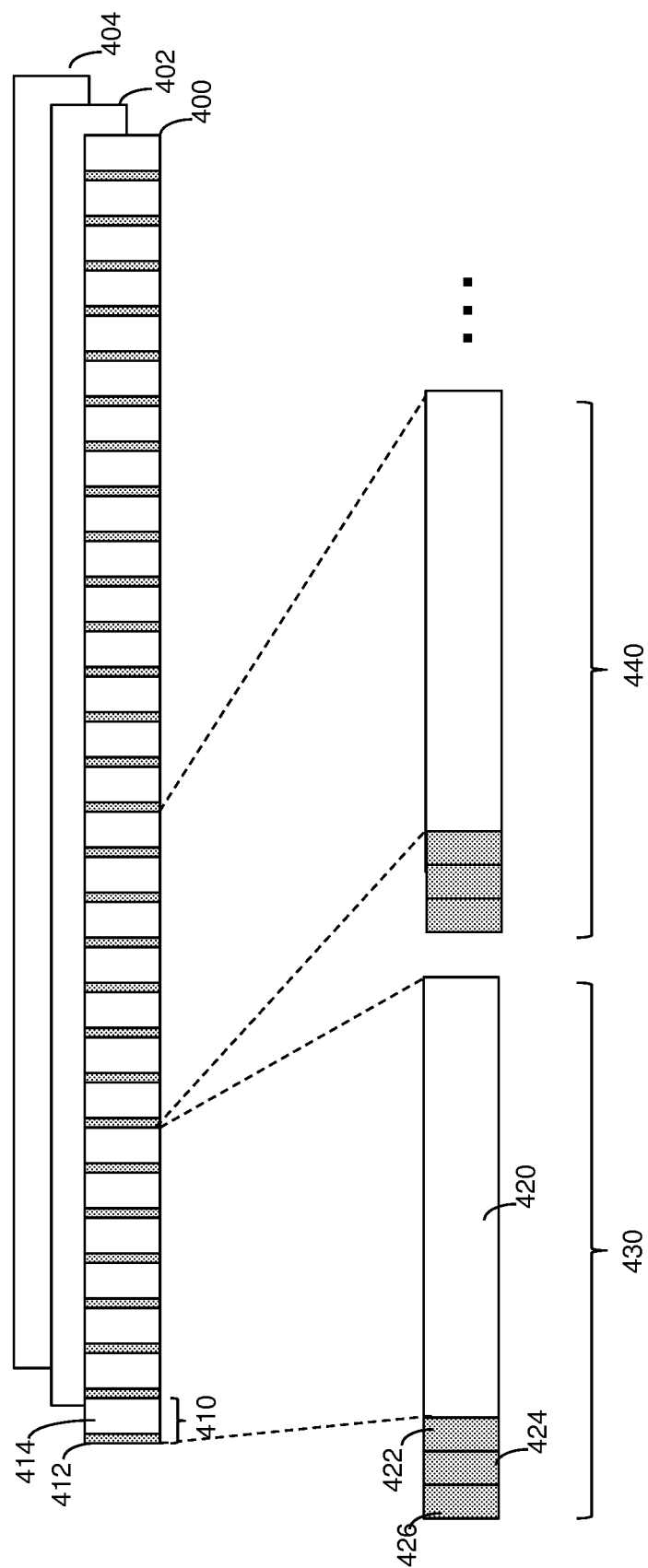
FIG. 4 illustrates how transport stream chunks are carried over IP packets using RTP.
Figure 8:
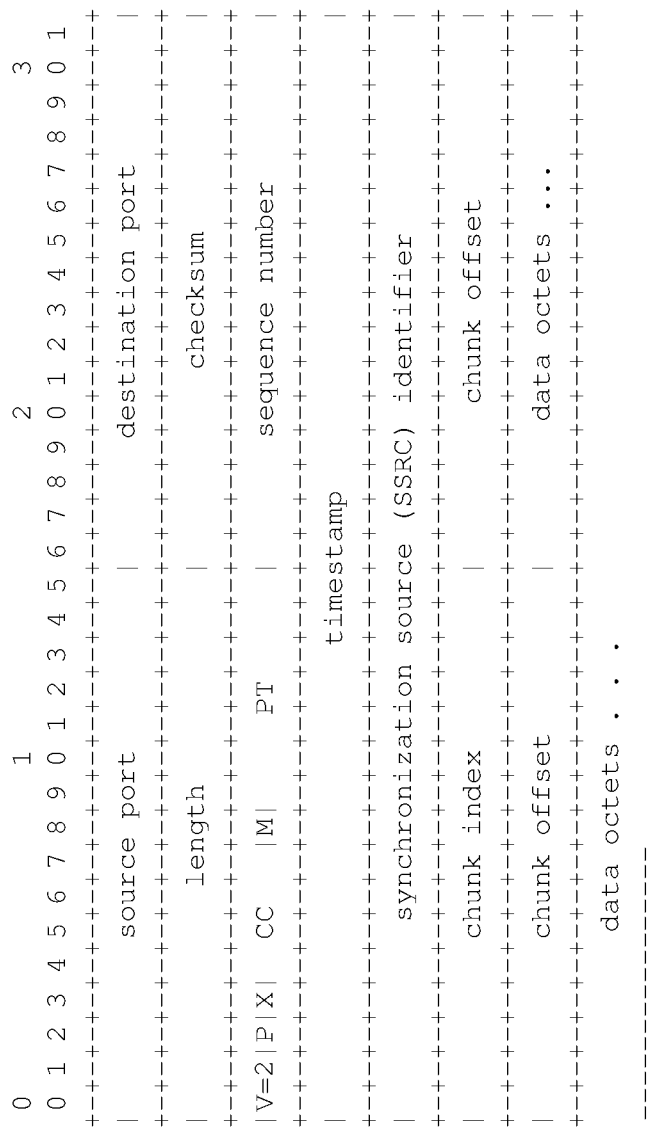
FIG. 8 shows the format of a complete IP packet in an example of the present invention.

FIG. 4 illustrates the format of the transport stream chunks and the RTP packets in which they are carried for a multicast stream. Three transport stream chunks 400, 402 and 404 are shown, each carrying the segmented content as described earlier. Each transport stream chunk comprises multiple transport stream packets 410, where each transport stream packet has an associated header 412 and a payload 414. The transport stream packets are carried in the payload 420 of an RTP packet. Each new transport stream chunk will start in a new RTP payload, thus avoiding the situation where one RTP payload might carry the end of one transport stream chunk and the start of the next. The RTP packet includes a standard RTP header 422. The RTP packet, which comprises the RTP header 422 and RTP payload 420, are encapsulated using UDP in an IP packet 430, and thus there is shown a UDP header 424 and an IP header 426. In effect, the RTP payload 420 and RTP header 422 form the payload of the UDP packet, and the UDP payload and UDP header 424 in turn form the payload of the IP packet 430

To illustrate, if the content is a 1 Mbit/s video stream, and segmented into 2 second chunks, each chunk will contain 2 Mbits or 250 Kbytes. Thus, each chunk would be carried over about 190 RTP payloads each containing up to seven Transport Stream packets of 188 bytes.

The format of the UDP header 424 is shown in more detail in FIG. 5.

The format of the RTP header 422 is shown in more detail in FIG. 6.

In an example of the invention, there is proposed the use of additional RTP headers to help identify chunk boundaries in the multicast stream. This is required by the receiving client to identify individual chunks, in order to enable switching to be made cleanly between the chunks delivered over unicast and those delivered over multicast. In an example of the invention, there is proposed using some additional marking to indicate which RTP payloads are carrying which chunks, and where the chunk boundaries lie. In practice, each transport stream chunk will be carried over many RTP payloads, and so chunk boundaries will occur after many RTP payloads (see above where an example of a 2 second chunk requires about 190 RTP payloads). In the simplest solution, the RTP packet that carries the end of a chunk can be marked to indicate the end of the chunk.

However, multicast delivery is usually performed using RTP/UDP, as in this example, and is therefore unreliable: some packets transmitted by the content server 104 may not be received by the client. Usually with multicast delivery though, a retransmission server is used to retransmit lost packets, as requested by the client, using reliable TCP transmission. Failures are still possible though, as losses in retransmission may result in lost multicast data being delivered to the client, but delivered too late to be usefully decoded.

Therefore, some resilience in the signalling of which packets a chunk ends in is required for the multicast stream, as the single packet marker might reside in one of the lost multicast packets. The solution proposed is to include additional information in each RTP packet of the multicast stream, giving information about the chunk number as well as the chunk boundary by using a modified header. The additional information can be carried in the RTP Payload Header Format.

In this application, the additional information includes two additional numerical parameters, a CHUNK_INDEX parameter and a CHUNK_OFFSET parameter. The CHUNK_INDEX parameter and CHUNK_OFFSET parameter are both shown in the RTP payload header format of FIG. 7. Either can be used, individually or in combination, to indicate which chunks are present in which RTP payload.

The CHUNK_INDEX parameter is a sequence number that identifies which chunks are being carried in which packets, and also indicates chunk boundaries. The CHUNK_INDEX is also used to match chunks in the multicast stream with the chunks in an associated unicast stream.

In unicast, chunks are associated, in the manifest file, with a URL to access the file, but also in some cases, are additionally associated with a numerical parameter, for example the EXT-X-MEDIA-SEQUENCE parameter used by Apple HLS. In this invention, each unicast chunk is associated with a numerical parameter determined by analysis of the manifest file. This numerical parameter is equal to the explicit numerical value in the manifest file, derived for example from the EXT-X-MEDIA-SEQUENCE parameter, if an explicit numerical value is present. Otherwise this numerical parameter is derived from the URL of the chunk, this numerical parameter being equal to the numerical file name suffix part of the URL of the chunk, where the URL in its entirety consists of the concatenation of a file path, a root file name, and a numerical file name suffix.

This numerical value associated with a chunk corresponds in a one to one fashion with the value of the CHUNK_INDEX parameter associated with the chunk when it is transmitted by multicast. One example of such a one to one mapping is to use the numerical value as the value of CHUNK_INDEX.

The following is an example HLS manifest—EXT-X-MEDIA-SEQUENCE indicates the value associated with the first chunk in the file (2680), and thus the remaining values are derived from this first value (2681 and 2682). Note, that these values are consistent with the values that can be derived from the numerical suffix of the corresponding file (which in example below are also 2680, 2681 and 2682):

EXTM3U
EXT-X-VERSION:3
EXT-X-TARGETDURATION:8
EXT-X-MEDIA-SEQUENCE:2680

EXTINF:7.975,
https://priv.example.com/fileSequence2680.ts
EXTINF:7.941,
https://priv.example.com/fileSequence2681.ts
EXTINF:7.975,
https://priv.example.com/fileSequence2682.ts Thus, this numerical value acts a sequence number of sorts in unicast, and in the multicast stream, assigning the CHUNK_INDEX value also follows the same convention, with a packet carrying a chunk or part of a chunk being assigned a CHUNK_INDEX equal to the sequence number assigned to the equivalent unicast chunk. The content server 104 marks the payload header of each packet with this CHUNK_INDEX.

To illustrate, if the chunk sequence number is 2680 in unicast, then all the packets used to carry that chunk are marked with a CHUNK_INDEX of 2680 for the multicast stream. Then when the next chunk, which has a sequence number of 2681 in unicast, processed, the packets carrying that chunk have a CHUNK_INDEX of 2681.

Turning now to the CHUNK_OFFSET parameter. In a first example, the CHUNK_OFFSET parameter takes a numerical value that increases by one with each packet of a given chunk and is set to zero in the first packet of a new chunk. In this case, the CHUNK_OFFSET parameter can then be used to identify chunk boundaries, not only by identifying packets with the value zero as the first of a chunk, but also in the case of such a packet being lost, identifying a chunk boundary by a decrease in the value of CHUNK_OFFSET. To illustrate, the CHUNK_OFFSET for the first packet carrying a chunk can be set to 0, and then the second packet which is carrying part of the same chunk will have a CHUNK_OFFSET set to 1, and a third packet carrying the final part of the same chunk will have a CHUNK_OFFSET set to 2. Then the next packet after that, which is carrying a new chunk, will have the CHUNK_OFFSET reset to 0, or any value lower than 2. Thus, either a CHUNK_OFFSET parameter of 0 or simply a decrease from a previous CHUNK_OFFSET parameter signals the start of a new chunk.

In a second example, the CHUNK_OFFSET parameter can be used to indicate the total number of bytes of data in the payloads of all the preceding packets that carry a given chunk. The first packet of a chunk would therefore carry the value of 0, and subsequent packets would carry monotonically increasing values. As in the first example, content chunk boundaries can be identified by a CHUNK_OFFSET equal to zero, or by a decreased value of CHUNK_OFFSET.

The use of the CHUNK_INDEX with the CHUNK_OFFSET parameter addresses the unlikely problem of losing precisely the number of packets that carry a single chunk, which would mean that the CHUNK_OFFSET parameter alone would still increment as expected. The CHUNK_INDEX acts as a sequence number for the chunk, and would highlight missing chunks, as well as providing synchronisation with the unicast stream chunks.

The example where the CHUNK_OFFSET indicates the total bytes of data carried in the payloads of the preceding packets for a given chunk, additional benefits are realised. In particular if the multicast stream is used to deliver encoded content in the ISO Base Media File Format and there isn't a retransmission service for packets lost during multicast transmission, or if the retransmission fails. For transport stream based packets, any lost packets can be handled by the client by seeking to the start of the next transport stream chunk using the CHUNK_INDEX for example. However, if the content is in ISO Base Media File Format, then this is not so simple, as the encoded video content is packed and requires an index table with offset values relative to the start of the chunk to unpack it. Thus, if some data is lost, then unless the amount of lost data is known, the data following the lost data cannot be used as the offset values are no longer valid. By setting the CHUNK_OFFSET parameter to indicate the number of bytes to date of content relating to a chunk, the loss of a packet does not result in an unknown amount of lost information, but rather the exact amount of lost information can be deduced, and the offsets in the index table remain usable for processing the subsequent packets of the content chunk.

The marking and generation of the IP packets for multicast transmission is handled by the multicast stream generator 230, and performed in step 308. The resulting multicast stream is output via the output interface 234, where it can be delivered to the network.

Marking at the level of the transport level of the chunks of video ensures the system is tolerant of any changes in video specifications. For example, chunk boundaries can still be determined using this method even if a new video/audio format is used.

More generally, marking chunk boundaries at the transport level avoids the need to process deeper into the chunk data, and thus requires no knowledge of video and audio bitstream specifications, and requires no knowledge of the transport container format, such as the MPEG-2 Transport Stream. It therefore supports additional and new video and audio formats. In addition, in the case that audio and/or video are encrypted, switching between unicast and multicast delivery can be performed seamlessly without the need for the client, or other processing device, to have knowledge of the decryption key.

The process of initiating a unicast stream, and then switching over to a multicast stream will now be explored with reference to one of the clients.

Processing starts with the client making an initial request for the manifest file associated with the content from the content server 104. The content server 104 returns the manifest file, which contains information identifying the location, in the data store 224, of the encoded content.

The client then starts requesting encoded content chunks via unicast in the form of HTTP requests for specific chunks as set out in the manifest from the content server 104, or more specifically the data store 224 (or web server). Thus, the client effectively pulls the content from the web server hosting the encoded content. The chunks requested are the individual transport stream chunks in this example.

The client may also make regular requests for an updated manifest from the content server 104. The content sever 104 can update the manifest file associated with any given content as it receives further transport stream chunks for that content. An updated manifest is created to reflect these additional chunks received from the content generator 102, and provided to the client when requested.

After a while, the switch logic may decide to make the content currently being retrieved by unicast also available by multicast. Note that the content will remain available for unicast from the data store 224, as there may be clients that are not able to or configured to receive multicast. The content server 104 updates the manifest with an indicator of a switch to multicast. In the case of a .m3u8 manifest file, the indicator could be of the form:

EXT-X-SWITCH: udp://239.1.2.3:4321

Where EXT-X-SWITCH indicates there is a switch of some kind, and udp://239.1.2.3:4321 indicates that it is multicast, giving the multicast address 239.1.2.3, port number 4321.

At the same time, the multicast stream generator 230 will start generating a multicast stream as described above with special transport layer packet headers identifying chunk boundaries. Based on this indicator in the manifest above, the resulting multicast stream is output by the output interface on port 4321, with address 239.1.2.3.

The client will in time request this updated manifest including the switch indicator. However, if it is important to signal the switch to multicast immediately, then as soon as the manifest has been updated, the content server 104 can include an Event Message in the content chunks being delivered over unicast to signal an update to the manifest. The client can then make a request for the updated manifest.

Event messages for MP4 files are defined in ISO/IEC 23009-1, and are carried in the Event Message box ('emsg').

Event messages for Transport streams are defined in ISO/IEC 13818-1:2013 Amd.4, where it is defined that Transport Packets with PID value 0x0004 are used for carriage of adaptive streaming information data, the payload format of which is the same as for MP4 files and is therefore also specified in ISO/IEC 23009-1.

Upon reading the updated manifest file, the client will know that a multicast group is available, and attempt to join it by issuing an IGMP join request.

The client will have read and know the chunk sequence number or index of the current unicast chunk that has been delivered, and will inspect the now flowing multicast stream for the CHUNK_INDEX parameter to identify the subsequent chunk(s) to be delivered from this source.

When the client first joins a multicast stream, the first data that it receives may not be that from the start of a chunk. The client needs to identify a point in the multicast stream that corresponds to a point in the unicast data that it has already received. One such point is the start of a chunk, identified in this invention, as described above, by observing either a reduction in the value the CHUNK_OFFSET parameter or a change in the CHUNK_INDEX parameter. The client identifies the same point in the unicast data that it has received by a similar change in the numerical parameter associated with the unicast chunks to the change in value of the CHUNK_INDEX parameter in the multicast. The client processes unicast chunks up to the identified point, and then processes multicast chunks from that same point onwards.

A parameter can be used in the multicast stream to indicate that the multicast stream is about to terminate and that a request for the manifest for the unicast stream should be initiated.

One way to signal that multicast delivery will soon become unavailable is to signal this in the RTP payload header. This could be signalled as a one bit flag in each RTP packet, which when set to '1' indicates that this content chunk is the last to be delivered by multicast; or it could be signalled as a multiple bit numerical value indicating the number of chunks, including the current one, that will be delivered by multicast, with the value of zero indicating that the end of multicast delivery is not imminent.

When the client is receiving content over unicast, it makes regular HTTP GET requests to the content server for manifest updates. These requests can be captured by the switch logic via HTTP logs, and used in helping determine whether and when to switch between unicast and multicast. However, when delivering via multicast, the client does not make regular requests, as all the information needed by the client to switch back to unicast is embedded as marker packets in the multicast stream.

Therefore, in a further example of the invention, the client is configured to make regular HTTP 'HEAD' requests to the content server 104 for updates to the manifest file. A HEAD request generally returns metadata associated with a requested file, in this case the manifest file. Whilst the manifest file is not actually needed during a multicast stream, forcing the client to make HEAD requests at regular intervals whilst receiving a multicast stream provides feedback to the content server 104 that the client is actively receiving the multicast stream. Thus, the switch logic is able to determine how many clients in the network are actively receiving any given content over a multicast channel.

By comparing the number of HEAD requests with the number of GET requests (made by unicast receiving clients for requesting specific chunks of content) at the content server 104, the switching logic 232 can determine at any time how many clients are receiving which content, and whether using multicast or unicast. In the light of this knowledge the switching logic 232 can make the appropriate choice of multicast or unicast for a particular piece of content.

Forcing receiving clients send HEAD requests instead of GET requests allows the content server to easily distinguish between feedback from unicast (GET) and feedback from multicast (HEAD).

Furthermore, another major advantage of this approach is that it is independent of any lower level multicast logic. For example, even of one made a count the IGMP joins for a multicast stream, there is no way of telling which clients are still consuming the content. Clients may explicitly leave the multicast group, but they may also simply stop listening. This approach provides a solution.

Whilst the above examples have been described in relation to streaming content directly to a client using unicast or multicast, an alternative example proposes use of a client proxy. A client proxy might reside in a suitably configured router or hub local to the client, which can provide a proxy service to more than one client. The primary purpose of a client proxy is to receive content chunk data by multicast, store it locally, and advertise it to the clients as being available by unicast from the client proxy. This would enable multicast delivery to be used to deliver to the client proxy, obtaining the network efficiency benefits of multicast delivery, and enables eventual delivery to clients that might not support multicast and/or are connected to the proxy using a technology that is not well suited to deliver data by multicast (such as WiFi).

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing multicast video delivery comprising:
   receiving a multicast video stream at a plurality of client devices from a content server;
   transmitting regularly from each of the client devices, while a multicast video stream is being received, a first message to the content server in response to receiving the multicast video stream;
   determining, at the content server, the number of client devices receiving the multicast video stream based on the regularly transmitted first messages; and
   managing the multicast video delivery in dependence on the number of client devices determined,
   wherein each of the first messages from the client devices to the content server is an HTTP HEAD request message; and
   wherein the method further comprises:
   receiving a unicast video stream at another plurality of client devices from the content server;
   transmitting regularly from each of the client devices receiving a unicast video stream, while the unicast video stream is being received, a second message to the content server in response to receiving the unicast the video stream, the second message being an HTTP GET request and being different from the first message;
   determining the number of client devices receiving the unicast video stream based on the transmitted second messages;
   comparing the determined number of client devices receiving the unicast video stream and the determined number of client devices receiving the multicast video stream; and
   managing the multicast video delivery based on the comparison of the determined number of client devices receiving the unicast video stream and the determined number of client devices receiving the multicast video stream.

2. A method according to claim 1, wherein the HTTP HEAD request is for updates to a manifest file associated with the video stream.

3. A content server comprising:
   a processing system operatively coupled to a communications interface and a data store for storing video content so that the content server is configured to at least:
   transmit a multicast video stream to a plurality of client devices;
   receive a first message transmitted regularly from each of the client devices while a multicast video stream is being received by the client devices in response to receipt of the multicast video stream by the client devices;
   determine the number of client devices receiving the multicast video stream based on the received first messages which are transmitted regularly from each of the client devices;
   manage the multicast video delivery in dependence on the number of client devices determined;
   wherein each of the first messages from the client devices to the content server is an HTTP HEAD request message; and
   wherein the content server is further configured to:
   transmit a unicast video stream to a second plurality of devices;
   receive a second message transmitted regularly from each of the client devices receiving the unicast video stream while the unicast video stream is being received by each of the second plurality of client devices, the second message being an HTTP GET request and being different from the first message;
   determine the number of client devices receiving the unicast video stream based on the transmitted second messages;
   compare the determined number of client devices receiving the unicast video stream and the determined number of client devices receiving the multicast video stream; and
   manage the multicast video delivery based on the comparison of the determined number of client devices receiving the unicast video stream and the determined number of client devices receiving the multicast video stream.

4. The content server according to claim 3, wherein the HTTP HEAD request is for updates to a manifest file associated with the video stream.

5. A method of managing multicast video delivery comprising:
   receiving a multicast video stream at a plurality of client devices from a content server;

transmitting regularly from each of the client devices, while a multicast video stream is being received, a first message to the content server in response to receiving the multicast video stream;

determining, at the content server, the number of client devices receiving the multicast video stream based on the regularly transmitted first messages;

receiving a unicast video stream at another plurality of client devices from the content server;

transmitting regularly from each of the client devices receiving a unicast video stream, while the unicast video stream is being received, a second message to the content server in response to receiving the unicast the video stream, the second message being an HTTP GET request and being different from the first message;

determining the number of client devices receiving the unicast video stream based on the transmitted second messages;

comparing the determined number of client devices receiving the unicast video stream and the determined number of client devices receiving the multicast video stream; and managing the multicast video delivery based on the comparison of the determined number of client devices receiving the unicast video stream and the determined number of client devices receiving the multicast video stream.

6. A method according to claim 5, wherein the managing comprises determining whether to continue transmission of the video stream by multicast.

7. A content server comprising:
a processing system operatively coupled to a communications interface and a data store for storing video content so that the content server is configured to at least:
transmit a multicast video stream to a plurality of client devices;
receive a first message transmitted regularly from each of the client devices while a multicast video stream is being received by the client devices in response to receipt of the multicast video stream by the client devices;
determine the number of client devices receiving the multicast video stream based on the received first messages which are transmitted regularly from each of the client devices;
transmit a unicast video stream to a second plurality of devices;
receive a second message transmitted regularly from each of the client devices receiving the unicast video stream while the unicast video stream is being received by each of the second plurality of client devices, the second message being an HTTP GET request and being different from the first message;
determine the number of client devices receiving the unicast video stream based on the transmitted second messages;
compare the determined number of client devices receiving the unicast video stream and the determined number of client devices receiving the multicast video stream; and
manage the multicast video delivery based on the comparison of the determined number of client devices receiving the unicast video stream and the determined number of client devices receiving the multicast video stream.

8. The content server according to claim 7, wherein the content server is further configured to determine whether to continue transmission of the video stream by multicast in order to manage the multicast video delivery based on the comparison of the determined number of client devices receiving the unicast video stream and the determined number of client devices receiving the multicast video stream.

9. A method of managing multicast video delivery comprising:
receiving a multicast video stream at a plurality of client devices from a content server;
transmitting regularly from each of the client devices, while a multicast video stream is being received, a first message to the content server in response to receiving the multicast video stream;
determining, at the content server, the number of client devices receiving the multicast video stream based on the regularly transmitted first messages; and
managing the multicast video delivery in dependence on the number of client devices determined,
wherein each of the first messages from the client devices to the content server is an HTTP HEAD request message; and
wherein the method further comprises determining a number of client devices requesting a unicast video stream; and
wherein the multicast video delivery is managed in dependence on the determined number of client devices receiving the multicast video stream and the determined number of client devices requesting the unicast video stream.

10. A method according to claim 9, wherein the requests for the unicast video stream from the client devices are HTTP GET requests.

11. A method according to claim 9, wherein
managing the multicast video delivery includes switching between unicast and multicast delivery methods in dependence on the determined number of client devices receiving the multicast video stream and the determined number of client devices requesting a unicast video stream.

12. A content server comprising:
a processing system operatively coupled to a communications interface and a data store for storing video content so that the content server is configured to at least:
transmit a multicast video stream to a plurality of client devices;
receive a first message transmitted regularly from each of the client devices while a multicast video stream is being received by the client devices in response to receipt of the multicast video stream by the client devices;
determine the number of client devices receiving the multicast video stream based on the received first messages which are transmitted regularly from each of the client devices;
manage the multicast video delivery in dependence on the number of client devices determined;
wherein each of the first messages from the client devices to the content server is an HTTP HEAD request message;
wherein: the content server is further configured to determine a number of client devices requesting a unicast video stream; and wherein the multicast video delivery is managed in dependence on the determined number of client devices receiving the multicast video stream and the determined number of client devices requesting the unicast video stream.

13. The content server according to claim 12 wherein the requests for the unicast video stream from the client devices are HTTP GET requests.

14. The content server according to claim 12, wherein managing the multicast video delivery by the content server includes switching between unicast and multicast delivery methods in dependence on the determined number of client devices receiving the multicast video stream and the determined number of client devices requesting the unicast video stream.

* * * * *